(12) United States Patent
Gauthier et al.

(10) Patent No.: US 8,481,668 B2
(45) Date of Patent: Jul. 9, 2013

(54) SILANE-CONTAINING ADHESION PROMOTER COMPOSITION AND SEALANTS, ADHESIVES AND COATINGS CONTAINING SAME

(75) Inventors: Remy Gauthier, Aire (CH); Christine Lacroix, Ornex (FR)

(73) Assignee: Momentive Performance Materials Inc., Waterford, NY (US)

( * ) Notice: Subject to any disclaimer, the term of this patent is extended or adjusted under 35 U.S.C. 154(b) by 581 days.

(21) Appl. No.: 11/291,235

(22) Filed: Dec. 1, 2005

(65) Prior Publication Data

US 2007/0066768 A1 Mar. 22, 2007

Related U.S. Application Data

(60) Provisional application No. 60/717,721, filed on Sep. 16, 2005.

(51) Int. Cl.
*C08G 77/04* (2006.01)

(52) U.S. Cl.
USPC ............... 528/34; 528/901; 528/33; 528/17; 428/447

(58) Field of Classification Search
USPC ....................... 528/33, 34, 17, 901
See application file for complete search history.

(56) References Cited

U.S. PATENT DOCUMENTS

| | | | |
|---|---|---|---|
| 4,374,237 A | 2/1983 | Berger et al. | |
| 4,483,973 A | 11/1984 | Lucas et al. | |
| 4,483,974 A | 11/1984 | Grogler et al. | |
| 4,585,821 A | 4/1986 | Progneaux et al. | |
| 4,602,078 A | 7/1986 | Joseph et al. | |
| 4,797,446 A | 1/1989 | Dietlein et al. | |
| 4,978,704 A | 12/1990 | Perrin | |
| 5,554,686 A * | 9/1996 | Frisch et al. | 524/588 |
| 5,786,032 A | 7/1998 | Hughes | |
| 6,013,754 A | 1/2000 | Fillion et al. | |
| 6,034,171 A * | 3/2000 | Leempoel | 524/730 |
| 6,258,914 B1 * | 7/2001 | Su et al. | 528/15 |
| 6,395,858 B1 * | 5/2002 | Mack et al. | 528/38 |
| 6,602,964 B2 * | 8/2003 | Huang et al. | 525/477 |
| 7,345,120 B2 * | 3/2008 | Ho et al. | 526/220 |
| 7,605,203 B2 * | 10/2009 | Feng et al. | 524/268 |
| 2004/0138396 A1 | 7/2004 | Gabriel | |
| 2004/0181007 A1* | 9/2004 | Acevedo et al. | 524/589 |

FOREIGN PATENT DOCUMENTS

| | | |
|---|---|---|
| DE | 3903338 A1 | 8/1990 |
| EP | 0 500 115 B1 | 12/1994 |
| WO | WO 01/12693 A1 | 2/2001 |
| WO | WO 03/000775 A2 | 1/2003 |
| WO | WO 2005/042608 A1 | 5/2005 |
| WO | WO 2005/080462 A2 | 9/2005 |

OTHER PUBLICATIONS

Encylopedia of Polymer Science and Technology, Silicones, vol. 11, p. 765, 1978.*

* cited by examiner

*Primary Examiner* — Margaret Moore
(74) *Attorney, Agent, or Firm* — Dominick G. Vicari; Joseph S. Ostroff

(57) ABSTRACT

An adhesion promoter composition which comprises an oligomer of a functional alkoxysilane and a specific alkyl alkoxy silane is advantageously employed to improve the bonding of sealants/adhesives/coatings such as moisture curable sylated polymers on various substrates such as wet or dry concrete. In a preferred embodiment the adhesion promoter contains an octyltrialkoxysilane and an oligomer prepared from an epoxy or polyethylene oxide functional alkoxysilane.

14 Claims, No Drawings

SILANE-CONTAINING ADHESION PROMOTER COMPOSITION AND SEALANTS, ADHESIVES AND COATINGS CONTAINING SAME

CROSS REFERENCE TO RELATED APPLICATIONS

The present application claims priority to U.S. provisional application Ser. No. 60/717,721 filed Sep. 16, 2005, which is herein incorporated by reference.

BACKGROUND OF THE INVENTION

The present invention relates to compositions of monomeric silanes with, for example, oligosilanes, aminofunctional oligosiloxane, or silicone polymers. These compositions are useful, for example, as adhesion promoters for moisture-curable silylated resins to improve bonding of sealants or adhesives or coatings to many difficult substrates, especially dry and wet concrete.

To fulfill building construction requirements (e.g., ISO-standard specifications and the comparable DIN-EN standard specifications or ASTM standard specification), sealants, adhesives or coatings need to be applied on concrete substrates that have been already pretreated with special primer (mainly epoxy based). It is very difficult with the currently available organofunctional silane adhesion promoters to provide cohesive or strong adhesive bonding of the moisture-curable silylated sealant or adhesive on concrete after water immersion without pre-treatment of the concrete.

Concrete is made up of cement, sand, aggregate and water. The surface of the concrete is highly alkaline (pH ~12) and any absorbed water has a detrimental influence on the adhesion of the sealant or adhesive on the surface of the concrete. Concrete substrates are manufactured according standard ISO 13640 but the final preparation of the cast samples can be different (ISO 13640 method 1 and method 2) and can result in different surface textures ranging from relatively smooth, flat surfaces to rough surfaces. It is more difficult to get good wettability or adhesion of the sealant on rough concrete surfaces.

SUMMARY OF THE INVENTION

A composition is provided herein for promoting adhesion of sealants, adhesives, or coatings onto a substrate. The composition comprises:
a) at least one compound having the formula 1:

  [1]

wherein
each $R^1$ is independently selected from alkoxy or $C_1$-$C_3$ alkyl such as methyl, ethyl or propyl; with the proviso that at least two of the $R^1$ groups is alkoxy, and
R is alkyl having from 1 to about 20 carbon atoms or an organic group containing amine, epoxy, vinyl, sulfur, methacryl, acetoxy, ureido, isocyanurate, or polyethyleneoxide functionality; and,
b) at least one of an oligomeric silane or a silicone.

The adhesion promoter composition is useful for the preparation of high quality sealants, adhesives or coatings with improved processability. This invention enables sealants/adhesives/coating manufacturers and construction end users to apply moisture-curable silylated polymer compositions to concrete under virtually any condition, wet or dry, without concern about concrete pre-treatments, which allows for more robust use of these sealants/adhesives/coatings, eliminates an application step and avoids delays in application due to weather conditions.

DETAILED DESCRIPTION OF THE INVENTION

In the description below all composition percentages or parts are by weight unless stated otherwise. Numerical values should be understood as being modified by the term "about".

In an embodiment, the present invention comprises compositions of monomeric silanes with oligosilanes or silicone polymers, which are useful as adhesion promoters for moisture-curable silylated polymer to improve bonding of sealants, adhesives or coatings to many difficult substrates, especially dry and wet concrete.

In an embodiment of the invention, the silane composition includes at least one monomeric silane, or mixture of silanes, (e.g., an amino or nitrogen-containing silane) in the range of 40-95% by weight and 5-60% by weight of one or more oligomeric silane and/or one or more silicone polymers.

More particularly, in one embodiment the present invention is directed to a sealant or adhesive or coating composition blend comprising:
a) a moisture-curable silylated polymer resin; and
b) an adhesion promoter comprising one or more compound of formula 1:

  [1]

wherein
each $R^1$ is independently selected from alkoxy, preferably methoxy or ethoxy, or $C_1$-$C_3$ alkyl such as methyl, ethyl or propyl; with the proviso that at least two of the $R^1$ groups is alkoxy.

R is alkyl having from 1 to about 20 carbon atoms or an organic group containing amine, epoxy, vinyl, sulfur, methacryl, acetoxy, isocyanurate, or polyethyleneoxide functionality.

Suitable organic groups for R include, but are not limited to, methyl, ethyl, propyl, octyl, aminoethyl, aminopropyl, ureidopropyl, aminodimethylbutyl, aminoisobutyl, epoxycyclohexyl, glycidoxypropyl, vinyl, mercaptopropyl, octanoylthiopropyl, methacyloxy, methacrylaminopropyl or hexadecyl.

In an embodiment of the invention, the adhesion promoter includes an aminosilane and one or more compounds of formula 1 wherein R includes epoxy, vinyl, sulfur, methacryl, acetoxy, isocyanurate or polyethyleneoxide functionality.

In another embodiment the present invention is directed to a sealant/adhesive/coating composition blend comprising:
a) a moisture-curable silylated polymer resin; and,
b) as an adhesion promoter, an oligomer prepared from a compound of formula 1 optionally with tetraethylorthosilicate (TEOS), optionally including one or more compounds of formula 1.

In another embodiment the present invention is directed to a sealant/adhesive/coating composition blend comprising:
a) a moisture curable silylated polymer; and
b) as an adhesion promoter a mixture of silicone and nitrogen-containing monomeric silanes, optionally including one or more compounds of formula 1.

In an embodiment of the invention the adhesion promoter can be blended into a sealant composition in accordance with the following preferred composition percentages. Composition percentages outside the given ranges may alternatively be used when appropriate:

| Component | Preferred range |
|---|---|
| Moisture curable silylated polymer | 20% to 50% and all ranges therebetween. |
| Plasticizer | 10% to 30% and all ranges therebetween. |
| Filler | 30% to 60% and all ranges therebetween. |
| UV stabilizer | 0.2% to 1.0% and all ranges therebetween. |
| Thixotrope | 0.1% to 2.0% and all ranges therebetween. |
| Whitener or colorant | 0.5% to 4.0% and all ranges therebetween. |
| Moisture scavenger | 0.2% to 3.0% and all ranges therebetween. |
| Catalyst | 0.01% to 2.0% and all ranges therebetween. |
| Adhesion Promoter | 0.2% to 2.0% and all ranges therebetween. |

The polymer used as the sealant, adhesive or coating material can be based on any organic or inorganic backbone provided that the polymer has at least two pendant or terminal alkoxysilyl, aryloxysilyl or alkyloximinosilyl groups thereon. Such systems are known. Organic backbone polymer systems include silylated acrylics, silylated polyurethanes, silylated polyethers, silylated polyesters, silylated polyolefins and others. Inorganic backbone systems are exemplified by polyorganosiloxanes, for instance RTV silicones. In an embodiment of the invention the sealant, adhesive or coating material is made from polymers have an organic backbone such as a polyurethane or a polyether.

In an embodiment, the present invention employs silylated polyurethane resin (SPUR). In another embodiment, modified silicone polymer can be employed as the sealant/adhesive/coating material. Modified silicone polymers include polyethers functionalized with terminal alkoxysilane groups (e.g., methyldimethoxysilane, such as in MS Polymer referred to below). Optionally, the modified silicone polymer can be obtained by the hydrosilylation of a silane endgroup onto a vinyl terminated polyether. The following components can be used in blending adhesion promoters for use with the sealant/adhesive/coating material.

Amine:
Gamma-aminopropyltrimethoxysilane
N-(beta-aminoethyl)-gamma-aminopropyltrimethoxysilane
Bis(gamma-trimethoxysilylpropylamine)
Gamma-ureidopropyltrimethoxysilane
4-Amino-3,3-dimethylbutyltrimethoxysilane.
4-Amino-3,3-dimethylbutylmethyldimethoxysilane
N-Ethyl-gamma-aminoisobutyltrimethoxysilane
Aminoalkyl oligomeric silane (composed of partially co-hydrolyzed.
Propyltrimethoxysilane
  Epoxide
Beta (3,4-epoxycyclohexyl)ethyltriethoxysilane
Beta (3,4-epoxycyclohexyl)ethyltrimethoxysilane
Gamma-glycidoxypropyltriethoxysilane
Gamma-glycidoxypropyl trimethoxysilane
Gamma-glycidoxypropylmethyldiethoxysilane
  Vinyl
Vinyltrimethoxysilane
Vinyl triethoxysilane
Vinyl triisopropoxysilane
Vinyl methyldimethoxysilane
Proprietary vinyl organofunctional silanes
  Sulfur
Gamma-mercaptopropyltrimethoxysilane
Gamma-mercaptopropyltriethoxysilane
3-Octanoylthio-1-propyltriethoxysilane
Oligomerized gamma-mercaptopropyltrimethoxysilane
Bis-(3-[triethoxysilyl]propyl)disulfide
Bis-(3-[triethoxysilyl]propyl)polysulfide
Proprietary polysulfide silanes
  Methacryl
Gamma-methacryloxypropyltrimethoxysilane
Gamma-methacryloxypropyltriethoxysilane
Gamma-methacrylamidopropyltrimethoxysilane
Gamma-methacryloxypropyltriisopropoxysilane
  Alkyl
Octyltriethoxysilane
Propyltriethoxysilane
Methyl triethoxysilane
Methyl trimethoxysilane
  Oligomeric structures:
Oligomer aminoalkylalkoxy silane,
Oligomer aminoalkoxysilane
Epoxy silane oligomer disclosed in U.S. patent application Ser. No. 11/100,840 filed Apr. 7, 2005, which is herein incorporated by reference.
NXT™ Ultra-Low V Silane (Available from General Electric Co.)
NXT™ Low V Silane (Available from General Electric Co.)
  Silicones
Aminofunctional oligosiloxane
Methacryl endcapped silicone
Blends of trisiloxanes
Epoxy silicone
Linear aminosilicone polyether copolymer
Aminoethylaminopropyl cyclic oligosiloxane
Phenylethyl modified siloxane
Octyl functional trisiloxane
Silicone polymers modified with alkylene oxide polymers (polyether copolymers)
Aminosilicones, (aminoethyl, aminopropyl, methyl functionality)
  Others:
4-acetoxy-3-methoxyphenylpropyltrimethoxy silane
Tris[3-(trimethoxysilylpropyl)]isocyanurate
Poly(ethyleneoxide)trimethoxysilane
Hexadecyltrimethoxy silane
Bis(triethoxysilyl)ethane The following compositions are non-limiting examples of blends which are suitable for use in the invention.

Composition
1 Gamma-aminopropyltrimethoxysilane (60% to 95%)
  Aminosiloxane (5% to 40%)
2 Gamma-aminopropyltrimethoxysilane (30% to 50%)
  Bis(gamma-trimethoxysilylpropylamine) (30% to 50%)
  Octyltriethoxysilane (5% to 30%)
3 Gamma-aminopropyltrimethoxysilane (10% to 30%)
  Bis(gamma-trimethoxysilylpropylamine) (50% to 70%)
  Octyltriethoxysilane (5% to 30%)
4 Gamma-aminopropyltrimethoxysilane (30% to 50%)
  Tris[3-(trimethoxysilylpropyl)]isocyanurate (30% to 50%)
  Aminosiloxane (10% to 30%)
5 Gamma-aminopropyltrimethoxysilane (50% to 70%)
  Bis(gamma-trimethoxysilylpropylamine) (10% to 30%)
  Octyltriethoxysilane (5% to 30%)
6 Gamma-ureidopropyltrimethoxysilane (40% to 60%)
  Tris[3-(trimethoxysilylpropyl)]isocyanurate (40% to 60%)
7 Gamma-aminopropyltrimethoxysilane (30% to 50%)
  Bis(gamma-trimethoxysilylpropylamine) (30% to 50%)
  Tris[3-(trimethoxysilylpropyl)]isocyanurate (5% to 20%)
  Silicone Polymers modified with alkylene oxide polymers (5% to 20%)
8 Gamma-aminopropyltrimethoxysilane (30% to 50%)
  Tris[3(trimethoxysilylpropyl)]isocyanurate (5% to 50%)

Aminosilicones, aminoethyl-aminopropyl, methyl functionality (5% to 30%)

9 Gamma-aminopropyltrimethoxysilane (30% to 50%)
Bis(gamma-trimethoxysilylpropylamine) (30% to 50%)
Poly(ethyleneoxy) trimethoxysilane (5% to 20%)
Silicone Polymers modified with alkylene oxide polymers (5% to 20%)

10 Gamma-aminopropyltrimethoxysilane (10% to 30%)
Bis(gamma-trimethoxysilylpropylamine) (50% to 70%)
Poly(ethyleneoxy)trimethoxysilane (5% to 20%)
Silicone Polymers modified with alkylene oxide polymers (5% to 20%)

11 Gamma-aminopropyltrimethoxysilane (10% to 30%)
Bis(gamma-trimethoxysilylpropylamine) (30% to 70%)
Poly(ethyleneoxide)trimethoxysilane (10% to 30%)

12 Gamma-aminopropyltrimethoxysilane (30% to 50%)
Bis(gamma-trimethoxysilylpropylamine) (30% to 50%)
Poly(ethyleneoxide)trimethoxysilane (5% to 30%) linear aminosilicone polyether copolymer (5% to 20%)

13 N-(beta-aminoethyl)-gamma-aminopropyltrimethoxy-silane (70% to 90%)
Aminosiloxane (5% to 30%)

The plasticizers customarily employed can also be used in the invention to modify the properties and to facilitate use of higher filler levels. Exemplary plasticizers include, but are not limited to, phthalates, dipropylene and diethylene glycol dibenzoates and mixtures thereof, epoxidized soybean oil and the like. Useful sources of dioctyl and diisodecyl phthalate include those available under the tradenames "Jayflex DOP" and "Jayflex DIDP" from Exxon Chemical. The dibenzoates are available as "Benzoflex 9-88", "Benzoflex 50" and "Benzoflex 400" from Velsicol Chemical Corporation. The plasticizer typically comprises up to 100 parts per hundred parts of the silylated polymer with 40 to 80 parts per hundred being preferred.

Typical fillers suitable for formulation of the sealants include, but are not limited to, reinforcing fillers such as fumed silica, precipitated silica and calcium carbonates. To further improve the physical strength of the formulations, reinforcing carbon black can be used as a main filler, leading to black systems. Several commercial grades of carbon black useful in this invention are available, such as "Corax" products (Degussa). To obtain translucent formulations, higher levels of fumed silica or precipitated silica should be used as the main filler, without carbon black.

Treated calcium carbonates having particle sizes from 0.07 microns to 4 microns are preferred fillers and are available under several trade names, such as: "Ultra Pflex" and "Hi Pflex" from Specialty Minerals; "Winnofil SPM" and "Winnofil SPT" from Zeneca Resins; "Hubercarb 1Qt", "Hubercarb 3Qt" and "Hubercarb W" from Huber and "Kotomite" from ECC. These fillers can be used either alone or in combination. The fillers generally comprise up to 300 parts per 100 parts of the silylated polymer with 80 to 150 parts being the more preferred loading level.

UV stabilizers and/or antioxidants can be incorporated into the sealant formulations of this invention in an amount from 0 to 5 parts per hundred parts of silylated polymer with 0.5 to 2 parts being preferred. These materials are available from companies such as, for example, Great Lakes and Ciba Specialty Chemicals and include, but are not limited to, additives commercially available under the tradenames "Anox 20" and "Uvasil 299 HM/LM" (Chemtura), and "Irganox 1010," "Irganox 1076," "Tinuvin 770," "Tinuvin 327," "Tinuvin 213" and "Tinuvin 622 LD" (Ciba), respectively. The sealant formulations can include various thixotropic or anti-sagging agents. This class of additives is typified by various castor waxes, fumed silica, treated clays and polyamides. These additives typically comprise 1 to 10 parts per hundred parts of silylated polymer component with 1 to 6 parts being preferred. Useful thixotropes include, but are not limited to, those available as: "Aerosil" from Degussa, "Cab-O-Sil" from Cabot, "Castorwax" from CasChem, "Thixatrol" and "Thixcin" from Rheox, and "Disparlon" from King Industries.

Suitable catalysts include, but are not limited to, bismuth carboxylate, zirconium, aluminum or titanium chelates, dialkyltin dicarboxylates salts or oxide, such as dibutyltin dilaurate, dibutyltin acetate, and di-n-butyltin oxide, the stannous salts of carboxylic acids, such as stannous octoate and stannous acetate, and the like.

The sealant/adhesive/coating compositions can be applied to any suitable substrate such as metal, wood, asphalt, brick, stone, concrete and the like. The compositions are particularly suitable for application to concrete surfaces. Concrete can be highly alkaline (pH>7, ≧10, and usually about 12). Moreover, the surface can be wet, for example, after a rainfall before the surface has had time to dry.

The following examples illustrate features of the invention.

EXAMPLES

Samples of concrete substrates used in the examples consisted of concrete blocks of 75×12×25 mm, having a testing surface of 75×12 mm. They were manufactured according to the standard ISO 13640. Both of the two methods of concrete preparation set forth in the ISO standard were employed for evaluation. The concrete itself was manufactured according to the same recipe for both methods. However, the final preparation of the cast samples differed so as to provide samples with different surface texture.

In accordance with ISO 13640 Method 1 the testing surface of the concrete samples was wet cut so as to provide a smooth and flat testing surface.

In accordance with ISO 13640 Method 2 the testing surface was brushed with a metallic brush to create surface roughness by exposing sand grains.

Once formulated, the sealant was applied onto the different substrates. Three conditioning methods were used:

"Dry" concrete: the samples were tested dry after the standard curing cycle of 2 weeks at 23° C., 50% relative humidity (RH).

"Pre-rinsed" concrete: the substrates were stored under water and wiped with a tissue just before use. The sealant was applied to the concrete surface while it was still humid, 3 minutes after taking it out of water. This test was useful to determine whether the sealant can be applied to the substrate before the substrate was fully dry, for example after a rain fall.

"Wet" concrete: The sealant was applied to the dry concrete; assemblies were immersed into water for one to four days and allowed to stand for one day at room temperature before the test evaluation after a standard two-week curing cycle.

The pH of the different concretes has been measured and found to be about 12.

The following tests were employed for performance evaluation.

A hand peel test was employed in which, for each sample, the sealant was peeled off by hand. The adhesion of the sealant was determined, wherein the adhesion was measured by the percentage of the surface of the concrete sample still covered with sealant after the test, divided by the area of the surface originally covered.

Since all samples resulted in 0% adhesion when tested after one-week immersion into water, the immersion time was reduced to one day or 4 days, followed by maintaining the sample one day at room temperature before testing. The results from both tests (hand peel at 90° C. and at 180° C.) were compared. The percentage of the sealant remaining on the concrete was evaluated visually on the concrete after the peeling by a Zwick machine.

The blends which gave the highest value in hand peel test were evaluated with the peel strength test.

On the concrete sample, first a silylated polyurethane resin ("SPUR") or modified silicone polymer ("MSP") sealant was applied followed by the application of a wire-netting treated with Silquest® Primer AP 134, a commercially available reactive silicone, and a second layer of SPUR or MSP sealant was applied. The wire-netting was slightly smaller than the concrete sample (by about 1 mm on each side). The total thickness of the system was between 5 and 8 mm. Preferably, the SPUR or MSP layer should recover all wire-netting.

After the samples were aged for two weeks at 23° C. and 50% relative humidity, the samples were placed on a Zwick machine for the Peeling test ASTM D 98 (ASTM C794: Standard Test Method) for Adhesion-in-Peel of Elastomeric Joint Sealants at 10 mm per minute up to 50 mm. The peeling force was recorded and the average force was calculated.

Additionally, to compare results from both tests (hand peel at 90° C. and at 180° C.). The percentage of the sealant remaining on the concrete was evaluated visually on the concrete after the peeling on a Zwick machine.

SPUR Sealant Formulations

The SPUR based sealant formulation had Witton WSP 725-80 (SPUR® 1010LM available from General Electric Co.) as base isocyanate terminated prepolymer with different batches of the same type of Witton resin.

Silylated polyurethane designated herein as SPUR 1 was made with a first batch of Witton WSP 725-80 base prepolymer. SPUR 4, 5 and 6 were made with a second batch of Witton WSP 725-80 base prepolymer. SPUR 7, 8, 9 and 10 formulations were made with a third batch of Witton WSP 725-80 base prepolymer. SPUR 13 formulation was made with a fourth batch of Witton WSP 725-80 base prepolymer. SPUR 14 to 26 formulations were made with a fifth batch of Witton WSP 725-80 base prepolymer. SPUR 27 formulation was made with a sixth batch of Witton WSP 725-80 prepolymer. The following components were used to prepare the moisture curable polymer composition:

|  | Parts |
|---|---|
| Silylated polyurethane (SPUR) | 125 |
| Plasticiser (DIDP). | 55 |
| CaCO3 fine (Winnofil SPT) | 192 |
| CaCO3 coarse (Omya BLR3) | 48 |
| UV stabilizers (Tinuvin 213&622LD) | 2 |
| SiO2 (Cabosil TS-720) | 1 |
| TiO2 (Ti-Pure R-902) | 5 |
| Silquest ® A-171 (Moisture scavenger) | 1.5 |
| Adhesion promoter | 2.5 |
| Catalyst (DBTDL) | 0.15 |

Modified Silicone Polymer (MSP) Sealant Formulations

The MSP sealant formulation (available from Kaneka Belgium Co.) was based on a pre-formulation to which the following ingredients were added:

| Silquest ® A-171 (moisture scavenger) | up to 3% |
|---|---|
| Adhesion promoter | up to 3% |
| Tin catalyst | up to 3% |

Sealant Preparation

Using a clean, dry, disposable metal mixing can, the silicon-containing polymer (SPUR/MSP) and the plasticizer (e.g., diisodecyl phthalate (DIDP)) were mixed by hand using a tongue blade or spatula. Thixotrope ($SiO_2$), whitener ($TiO_2$) and UV stabilizers were added and hand mixed in the blend, followed by addition of fillers (e.g., $CaCO_3$). The blend was then placed in a mixer for 5 minutes at a slow speed (<0.5 dial setting). The mixer was then opened to scrape down any material accumulated on the scraper and stirrers. The blend was then mixed at a moderate speed (dial setting=2.0-3.0) for 1 hour at 80° C. under vacuum until the sealant appeared smooth and uniform. The sealant mixture was then cooled down to not more than 50° C., and a dehydrating agent (Silquest® A-171) was added with mixing for 5 minutes. The vacuum was substituted with a nitrogen atmosphere and the sealant was transferred to the test boxes at about 85 g per box.

Two different methods were employed for the addition of the adhesion promoter to the SPUR formulations. For the SPUR 4, 5, 6, 7 formulations, the adhesion promoter and catalyst were added together, followed by mixing with SPUR in an Hauschild mixer for 1 minute 30 seconds. For all other formulation the adhesion promoter was added to SPUR and mixed into the Hauschild mixer for one minute. A minimum of five minutes was allowed to cool the mixture before adding the catalyst and the formulation was mixed again for one minute in the Hauschild mixer.

| Comparative Example 1: | SPUR 1 blended with gamma-aminopropyltrimethoxysilane (designated herein as A-1110). |
|---|---|
| Comparative Example 2: | SPUR formulations 1, 23, and 27 blended with gamma-aminopropyltrimethoxysilane (A:1110). |
| Comparative Example 3: | SPUR formulation 27 blended with gamma aminopropyltrimethoxysilane (A-1110) and AP-134 a commercially available solvent based silane primer. |
| Example 4: | SPUR formulations 14, 19 and 20 individually blended with an adhesion promoter comprising: 40% gamma-aminopropyltrimethoxysilane 40% bis(gamma-trimethoxysilyl propylamine) 20% octyltriethoxysilane |
| Example 5: | SPUR formulations 14, 19 and 22 individually blended with an adhesion promoter comprising: 20% gamma-aminopropyltrimethoxysilane 60% bis(gamma-trimethoxysilyl propylamine) 20% octyltriethoxy silane |
| Example 6: | SPUR formulations 14, 15 and 23 individually blended with an adhesion promoter comprising: 40% Gamma-aminopropyltrimethoxysilane 40% Tris[3-triemthoxysilylpropyl]isocyanurate 20% Aminosiloxane |
| Example 7: | SPUR formulations 14 and 15 individually blended with an adhesion promoter comprising: 60% Gamma-aminopropyltrimethoxysilane 20% Bis(gamma-trimethoxysilylpropylamine) 20% Octyltriethoxysilane |
| Example 8: | SPUR formulations 16, 25 and 26 individually blended with an adhesion promoter comprising: 50% Gamma-ureidopropyltrimethoxysilane 50% Tris[3-(trimethoxysilylpropyl)]isocyanaurate |
| Example 9: | SPUR formulation 27 blended with an adhesion promoter comprising: 40% Gamma-aminopropyltrimethoxysilane 40% Bis(gamma-trimethoxysilylpropylamine) 10% Tris[3-(trimethoxysilylpropyl)]isocyanaurate 10% Silicone Polymers modified with alkylene oxide polymers |

-continued

| Example 10: | SPUR formulation 27 blended with an adhesion promoter comprising:<br>40% Gamma-aminopropyltrimethoxysilane<br>40% Tris[3(trimethoxysilylpropyl)]isocyanurate<br>20% Aminosilicones, aminoethyl-aminopropyl, methyl functionality |
|---|---|
| Example 11: | SPUR formulations 26 and 27 individually blended with an adhesion promoter comprising:<br>40% Gamma-aminopropyltrimethoxysilane<br>40% Bis(gamma-trimethoxysilylpropylamine)<br>10% Poly(ethyleneoxide)trimethoxysilane<br>10% Silicone Polymers modified with akylene oxide polymers |
| Example 12: | SPUR formulation 27 blended with an adhesion promoter comprising:<br>20% Gamma-aminopropyltrimethoxysilane<br>60% Bis(gamma-trimethoxysilylpropylamine)<br>10% Poly(ethyleneoxide)trimethoxysilane<br>10% Silicone Polymers modified with alkylene oxide polymers |
| Example 13: | SPUR formulations 18, 26, and 27 individually blended with an adhesion promoter comprising:<br>20% Gamma-aminopropyltrimethoxysilane<br>60% Bis(gamma-trimethoxysilylpropylamine)<br>20% Poly(ethyleneoxide)trimethoxysilane |
| Example 14: | SPUR formulation 27 blended with an adhesion promoter comprising:<br>20% Gamma-aminopropyltrimethoxysilane<br>60% Bis(gamma-trimethoxysilylpropylamine)<br>15% Poly(ethyleneoxide)trimethoxysilane<br>5% linear aminosilicone polyether copolymer |
| Example 15: | SPUR formulation 13 blended with an adhesion promoter comprising:<br>80% Gamma-aminopropyltrimethoxysilane<br>20% aminosiloxane |

The tables below illustrate the test results for the blends of the following examples.

Comparative Examples 1, 2 and 3 are presented for comparison purposes only and do not exemplify the invention. Examples 4-15 exemplify the invention.

Wherein multiple SPUR formulations are tested in an example, each SPUR formulation is individually blended and with the identified adhesion promoter and tested. The test results indicated in the Table are the averaged values of the individual formulations.

The blends employed for Comparative Examples 1 and 2 were blends prepared with Silquest A-1110 and SPUR formulations as indicated in Table 1. The results of the hand peel test of Comparative Example 1 showed poor cohesion with only 5% of the SPUR remaining on the dry concrete sample as a result of the peel test. When tested on pre-rinsed concrete in accordance with ISO 13640 Method 1 (smooth concrete surface), the percentage of SPUR remaining was 80%. However, when tested on pre-rinsed concrete in accordance with ISO 13640 Method 2 (rough concrete surface), the percentage of SPUR remaining on the surface dropped to 5%. These ISO 13640 methods are referred to below as simply "method 1" or "method 2". With respect to the wet concrete tests (concrete with sealant immersed in water for one to four days with one day at room temperature), both smooth and rough concrete surfaces resulted in 0% adhesion.

In Comparative Example 2, SPUR formulations 1, 23 and 27 were employed with Silquest® A-1110 adhesion promoter. An average of the results are given in Table 1. The blends of Example B provided better test results than that of Example A.

Comparative Example 3 employed a blend of Silquest A-1110 and SPUR 27 with Silquest® Primer AP 134, which provided excellent results.

The blends of Example 4 prepared with SPUR formulations 14, 19 and 20 and adhesion promoter demonstrated good performance on dry and immersed concrete.

The blends of Example 5 prepared with SPUR formulations 14, 19 and 22 and adhesion promoter showed good results with dry concrete and pre-rinsed concrete as well as immersed concrete.

The blends of Example 6 prepared with SPUR formulations 14, 15 and 23 and adhesion promoter provided very good average results with excellent results for concrete (rough surface) and pre-rinsed concrete (smooth surface).

The blends of Example 7 prepared with SPUR formulations 14 and 15 and adhesion promoter showed very good results with dry and pre-rinsed concrete, but showed weaker adhesion in the immersion test.

The blends of Example 8 prepared with SPUR formulations 16, 25, and 26 and adhesion promoter provided very good results.

The blend of Example 9 with SPUR formulation 27 and adhesion promoter generally provided good results.

The blend of Example 10 with SPUR formulation 27 and adhesion promoter only showed good results for the pre-rinsed concrete test using smooth surface concrete (method 1).

The blends of Example 11 with SPUR 26 and 27 and adhesion promoter showed good average performance, with some weakness for the smooth surface dry concrete test (method 1).

The blend of Example 12 with SPUR formulation 27 and adhesion promoter showed weak results except for the excellent adhesion on pre-rinsed smooth surface concrete (method 1) and good results for the immersed rough surface concrete.

The blends of Example 13 with SPUR formulations 18, 26 and 27 and adhesion promoter showed good average results overall.

The blend of Example 14 with SPUR formulation 27 and adhesion promoter showed good results for the dry concrete and pre-rinsed smooth surface concrete.

The blend of Example 15 with SPUR formulation 13 and adhesion promoter showed excellent results on dry concrete and pre-rinsed smooth surface concrete.

TABLE 1

(Percentage of SPUR remaining on concrete at 90° C. with selected adhesion promoter compositions, hand peeling test)

| EXAMPLE | dry concrete 1 | dry concrete 2 | p-rins. concrete 1 | p-rins concrete 2 | concrete 1 immers. (1 day) | concrete 2 immers (1 day) |
|---|---|---|---|---|---|---|
| 1 (Comparative) | 5% | 5% | 80% | 5% | 0% | 0% |
| 2 (Comparative) | 60% | 30% | 90% | 50% | 30% | 60% |
| 3 (Comparative) | 100% | 95% | 100% | 90% | 80% | 80% |

TABLE 1-continued (Percentage of SPUR remaining on concrete at 90° C. with selected adhesion promoter compositions, hand peeling test)

| EXAMPLE | dry concrete 1 | dry concrete 2 | p-rins. concrete 1 | p-rins concrete 2 | concrete 1 immers. (1 day) | concrete 2 immers (1 day) |
|---|---|---|---|---|---|---|
| 4 | 40% | 80% | 90% | 5% | 30% | 40% |
| 5 | 30% | 90% | 70% | 50% | 30% | 70% |
| 6 | 50% | 95% | 90% | 40% | 40% | 80% |
| 7 | 70% | 70% | 90% | 60% | 10% | 0% |
| 8 | 70% | 90% | 80% | 90% | 20% | 50% |
| 9 | 50% | 50% | 70% | 5% | 50% | 50% |
| 10 | 5% | 20% | 70% | 5% | 0% | 5% |
| 11 | 25% | 70% | 50% | 35% | 30% | 50% |
| 12 | 5% | 20% | 95% | 5% | 0% | 50% |
| 13 | 45% | 47% | 70% | 25% | 60% | 40% |
| 14 | 20% | 70% | 50% | 5% | 5% | 40% |
| 15 | 70% | 100% | 100% | 10% | 5% | 10% |

The percent of SPUR remaining on concrete at 90° and 180°, and the adhesion force after the peeling test at 180° was determined for several blends of SPUR and adhesion promoters. The results are shown in Table 2. Two of the blends, labeled as "comparative" do not illustrate the invention but are provided for comparison purposes only.

Examples 16-19 are directed to tests of adhesion on dry concrete with smooth (method 1) or rough (method 2) surfaces. The peeling angles employed were 90° and 180° as indicated.

Examples 20-23 are adhesion tests performed with pre-rinsed concrete, and Examples 24 to 27 were performed with water-immersed samples of concrete.

Example 28-33 are directed to tests for determining the adhesion force of the respective sealant compositions on dry, pre-rinsed and water immersed concrete samples of smooth surface (method 1) or rough surface concrete (method 2).

TABLE 2

(% SPUR remaining on concrete at 90° and at 180° and Adhesion force after peeling test at 180°)

| EXAMPLE | | SPUR blend with Silquest A 1110 (comparative) | SPUR/ adhesion promoter blend of Example 6 | SPUR/ adhesion promoter blend of Example 8 | SPUR/ adhesion promoter blend of Example 11 | SPUR/ adhesion promoter blend of Example 13 | SPUR/ adhesion promoter blend of Example 15 | Silquest A 1110/SPUR 1 only at 90° (comparative) |
|---|---|---|---|---|---|---|---|---|
| 16 | Dry concrete method 1. Peeling 180° | 60% | 60% | 20% | 60% | 30% | 10% | — |
| 17 | Dry concrete method 1. Peeling 90° | 60% | 70% | 70% | 40% | 40% | 70% | 5% |
| 18 | Dry concrete method 2. Peeling 180° | 80% | 60% | 70% | 60% | 30% | 80% | — |
| 19 | Dry concrete method 2. Peeling 90° | 30% | 70% | 90% | 70% | 30% | 100% | 5% |
| 20 | Pre-rinsed concrete method 1 Peeling 180° | 60% | 40% | 40% | 80% | 95% | 40% | — |
| 21 | Pre-rinsed concrete method 1 Peeling 90° | 90% | 90% | 80% | 60% | 80% | 100% | 80% |
| 22 | Pre-rinsed concrete method 2 Peeling 180° | 10% | 30% | 30% | 50% | 10% | 10% | — |
| 23 | Pre-rinsed concrete method 2 Peeling 90° | 50% | 60% | 90% | 5% | 20% | 10% | 5% |
| 24 | Water immersion concrete method 1 4 days immersion Peeling 180° | 50% | 40% | 30% | 50% | 70% | 30% | — |
| 25 | Water immersion concrete method 1 1 day immersion Peeling 90° | 30% | 10% | 20% | 30% | 30% | 5% | 0 |
| 26 | Water immersion concrete method 2 4 days immersion Peeling 180° | 5% | 5% | 5% | 5% | 5% | 5% | — |
| 27 | Water immersion concrete method 2 1 day immersion Peeling 90° ADHESION FORCE (N/mm) Peeling test at 180° | 60% | 0% | 50% | 50% | 40% | 10% | 0 |
| 28 | Dry concrete method 1 | 34 N/mm | 23 N/mm | 25 N/mm | 20 N/mm | 8 N/mm | 23 N/mm | |
| 29 | Dry concrete method 2 | 35 N/mm | 20 N/mm | 38 N/mm | 18 N/mm | 14 N/mm | 30 N/mm | |
| 30 | Pre-rinsed concrete method 1 | 45 N/mm | 38 N/mm | 20 N/mm | 18 N/mm | 30 N/mm | 35 N/mm | |
| 31 | Pre-rinsed concrete method 2 | 16 N/mm | 16 N/mm | 20 N/mm | 18 N/mm | 6 N/mm | 12 N/mm | |

TABLE 2-continued (% SPUR remaining on concrete at 90° and at 180° and Adhesion force after peeling test at 180°)

| EXAMPLE | | SPUR blend with Silquest A 1110 (comparative) | SPUR/ adhesion promoter blend of Example 6 | SPUR/ adhesion promoter blend of Example 8 | SPUR/ adhesion promoter blend of Example 11 | SPUR/ adhesion promoter blend of Example 13 | SPUR/ adhesion promoter blend of Example 15 | Silquest A 1110/SPUR 1 only at 90° (comparative) |
|---|---|---|---|---|---|---|---|---|
| 32 | Water immersion concrete method 1. 4 days immersion | 27 N/mm | 20 N/mm | 18 N/mm | 21 N/mm | 18 N/mm | 25 N/mm | |
| 33 | Water immersion concrete method 2 4 days immersion | 8 N/mm | 7 N/mm | 17 N/mm | 4.5 N/mm | 8 N/mm | 6 N/mm | |

Adhesion tests were performed using MS Polymer® (MSP) resin. As mentioned above, MS Polymer® is a functionalized polyether endcapped with methyldimethoxysilane. The results are set forth below in Table 3. Comparative Examples 34, 35 and 36 are presented for comparison purposes only and do not exemplify the invention. Comparative Example 34 employs MSP resin without adhesion promoter. Comparative Example 35 employs a blend of MSP with a conventional adhesion promoter Silquest® A-1110. Comparative Example 36 employs a blend of MSP with Silquest A-1110, but wherein the concrete is pretreated with a primer AP-134.

Examples 37-41 employ blends of MSP with the adhesion promoters of Examples 10, 8, 11, 14 and 13, respectively. As can be seen, the MSP without any adhesion promoter (Comparative Example 34) provided very poor results. Comparative Example 36 with concrete pretreated with AP-134 primer provided excellent results. Comparative Example 35 (MSP with Silquest A-1110) provided poor results on smooth concrete (method 1) and better results on rough concrete (method 2).

Examples 37 and 38 showed good results overall except for the wet concrete with rough surface.

Examples 39 and 40 showed generally good performance except on rough concrete (method 2).

Example 41 showed excellent results on smooth concrete (method 1) and good performance for rough surface concrete (method 2).

The above results demonstrate the effectiveness of the adhesion promoters of the invention used in conjunction with moisture-curable silicon-containing polymers such as, e.g., silylated polyurethane resins and silicone polymers.

While the above description contains many specifics, these specifics should not be construed as limitations of the invention, but merely as exemplifications of preferred embodiments thereof. Those skilled in the art will envision many other embodiments within the scope and spirit of the invention.

What is claimed is:

1. A composition comprising:
   a) a moisture-curable silylated polymer selected from the group consisting of a silylated polyurethane polymer and polyether functionalized with terminal alkoxysilane groups; and,
   b) an adhesion promoting amount of at least one adhesion promoter consisting of:
      i) at least one compound having the formula 1:

R—Si(R$^1$)$_3$ [1]

wherein
      each R$^1$ is independently selected from alkoxy, and R is an alkyl group having 8 carbon atoms; and,
      ii) at least one oligomer prepared from a compound having formula 1:

R—Si(R$^1$)$_3$ [1]

TABLE 3

(% MSP remaining on concrete with selected silane compositions, hand peeling test)

| | | Concrete Meth 1 | | | Concrete Meth 2 | | |
|---|---|---|---|---|---|---|---|
| Example | MSP with adhesion promoter | Dry | Pre-rinsed | Wet | Dry | Pre-rinsed | Wet |
| 34 (Comparative) | MSP without Silane | 5% | 0% | 0% | 20% | 5% | 0% |
| 35 (Comparative) | MSP with Silquest A-1110 | 20% | 5% | 0% | 50% | 40% | 0% |
| 36 (Comparative) | MSP with Silquest A-1110 + primer AP 134 | 100% | 100% | 90% | 95% | 95% | 95% |
| 37 | MSP with adhesion promoter of Ex. 10 | 80% | 90% | 50% | 80% | 60% | 5% |
| 38 | MSP with adhesion promoter of Ex. 8 | 70% | 20% | 50% | 60% | 40% | 50% |
| 39 | MSP with adhesion promoter of Ex. 11 | 60% | 20% | 60% | 60% | 5% | 5% |
| 40 | MSP with adhesion promoter of Ex. 14 | 60% | 40% | 80% | 10% | 5% | 5% |
| 41 | MSP with adhesion promoter of Ex. 13 | 100% | 80% | 80% | 80% | 10% | 40% | wherein
each $R^1$ is independently selected from alkoxy, or $C_1$-$C_3$ alkyl, with the proviso that at least two of the $R^1$ groups are alkoxy, and R is an organic group containing epoxy or polyethyleneoxide functionality, wherein said composition is applied to or is on a concrete substrate.

2. The composition of claim 1 wherein the moisture-curable silylated polymer is a silylated polyurethane polymer.

3. The composition of claim 1 wherein the moisture-curable silylated polymer is polyether functionalized with terminal alkoxysilane groups.

4. The composition of claim 1 wherein the R group of the oligomer (ii) is epoxycyclohexyl or glycidoxypropyl.

5. The composition of claim 4 wherein the R group is glycidoxypropyl.

6. The composition of claim 1 wherein the compound (i) is octyltriethoxysilane.

7. The composition of claim 1 wherein the $R^1$ groups of compound (i) or oligomer (ii) are methoxy or ethoxy.

8. The composition of claim 1 wherein the oligomer (ii) is prepared from a compound selected from the group consisting of beta (3,4-epoxycyclohexyl)ethyltriethoxysilane, gamma-glycidoxypropyltriethoxysilane, gamma-glycidoxypropyl triethoxysilane, gamma-glycidoxypropylmethyldiethoxysilane and poly(ethyleneoxide)trimethoxysilane.

9. The composition of claim 1 wherein the adhesion promoter composition consists of at least one compound (i) in the range of 40 to 95 weight percent and the oligomer (ii) in the range of 5 to 60 weight percent based upon the total weight of components (i) and (ii).

10. The composition of claim 1 further comprising one or more component selected from the group consisting of plasticizers, fillers, UV stabilizers, thixotropes, colorants, moisture scavengers and catalysts.

11. A method for treating a substrate comprising:
a) providing a composition containing a moisture-curable silylated resin selected from the group consisting of a silylated polyurethane polymer and polyether functionalized with terminal alkoxysilane groups and an adhesion promoter, the adhesion promoter including,
i) at least one compound having the formula 1:

$$R\text{—}Si(R^1)_3 \quad [1]$$

wherein
each $R^1$ is alkoxy, and
R is alkyl having from 8 carbon atoms; and, ii) at least one oligomer prepared from a compound having formula 1:

$$R\text{—}Si(R^1)_3 \quad [1]$$

wherein
each $R^1$ is independently selected from alkoxy, or $C_1$-$C_3$ alkyl, with the proviso that at least two of the $R^1$ groups is alkoxy, and R is an organic group containing epoxy or polyethyleneoxide functionality; and
b) applying said composition to a surface of the substrate, wherein said substrate is concrete.

12. The method of claim 11 wherein the substrate has a pH of above 10.

13. The composition of claim 1 wherein the composition is a sealant, coating or adhesive.

14. A sealant, adhesive or coating composition comprising:
a) a moisture-curable moisture-curable silylated polymer selected from the group consisting of a silylated polyurethane polymer and polyether functionalized with terminal alkoxysilane groups; and,
b) an adhesion promoting amount of at least one adhesion promoter consisting of:
i) 40% to 95% by weight based upon the total weight of components (i) and (ii) of at least one compound having the formula 1:

$$R\text{—}Si(R^1)_3 \quad [1]$$

wherein
each $R^1$ is independently selected from alkoxy, or $C_1$-$C_3$ alkyl, with the proviso that at least two of the $R^1$ groups is alkoxy, and R is an alkyl group having from 8 to 20 carbon atoms; and,
ii) 5% to 60% by weight based upon the total weight of components (i) and (ii) of at least one oligomer prepared from a compound having formula 1:

$$R\text{—}Si(R^1)_3 \quad [1]$$

wherein
each $R^1$ is independently selected from alkoxy, or $C_1$-$C_3$ alkyl, with the proviso that at least two of the $R^1$ groups are alkoxy, and R is an organic group containing epoxy or polyethyleneoxide functionality, wherein said sealant, adhesive or coating composition is applied to or is on a concrete substrate.

* * * * *